United States Patent
Maes

(10) Patent No.: US 7,333,594 B2
(45) Date of Patent: Feb. 19, 2008

(54) MESSAGE-BASED EXPENSE APPLICATION

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 35 days.

(21) Appl. No.: 11/003,587

(22) Filed: Dec. 3, 2004

(65) Prior Publication Data

US 2008/0008303 A1    Jan. 10, 2008

(51) Int. Cl.
*H04M 1/64* (2006.01)
(52) U.S. Cl. ..................... 379/88.23; 705/30
(58) Field of Classification Search .............. 705/5, 705/30, 1, 6, 10; 379/88.17, 88.23; 704/257; 709/206; 713/178
See application file for complete search history.

(56) References Cited

U.S. PATENT DOCUMENTS

| | | | |
|---|---|---|---|
| 6,202,054 B1 | 3/2001 | Lawlor et al. | |
| 6,367,013 B1 * | 4/2002 | Bisbee et al. | 713/178 |
| 6,442,526 B1 * | 8/2002 | Vance et al. | 705/5 |
| 2001/0032076 A1 * | 10/2001 | Kursh | 704/257 |
| 2003/0200272 A1 * | 10/2003 | Campise et al. | 709/206 |
| 2006/0080126 A1 * | 4/2006 | Greer et al. | 705/1 |

FOREIGN PATENT DOCUMENTS

| | | |
|---|---|---|
| EP | 0762306 A2 | 3/1997 |
| WO | WO 99/16029 A1 | 4/1999 |
| WO | WO 01/77933 A1 | 10/2001 |
| WO | WO 02/07369 A2 | 1/2002 |

* cited by examiner

*Primary Examiner*—Gerald Gauthier
(74) *Attorney, Agent, or Firm*—Townsend and Townsend and Crew LLP

(57) ABSTRACT

A method for managing an expense report for an expense report application is provided. The expense report application is configured to update entries in an expense report based on messages received from one or more messaging channels. The method includes receiving a message sent through a messaging channel in the one or more messaging channels. The message includes expense information. An expense report is determined from the expense information. Entry information is then determined from the expense information. The expense report is then updated with the entry information.

50 Claims, 4 Drawing Sheets

MESSAGE-BASED EXPENSE APPLICATION

BACKGROUND OF THE INVENTION

The present invention generally relates to expense reports and more particularly to apparatus and methods for processing expense reports in response to messages received through a messaging channel.

When an employee of a company incurs an expense that is reimbursable, the employee typically fills out an expense report. A user may typically incur expenses when traveling. During a trip, a user will have to keep track of any expenses that are incurred. When the user returns from the trip, the user may use his/her records in order to fill out an expense report. An expense application may be used where the employee can interact with the application that has been installed on a computing device in order to fill out an expense report for reimbursement.

The above process includes many disadvantages. For example, the expense application that is used is typically installed on a corporation's computer network. Thus, a user needs to access the corporate network using a computer to use the expense application. In some cases, access to the network is not available while traveling and thus a user cannot fill out an expense report using the expense application.

Also, when a user is traveling, it may be burdensome to keep track of all the expenses that are incurred. This is especially true if a user travels often or is on a long business trip. Additionally, when many expenses are incurred, there is a chance that a user may lose records of the expenses or forget to record that an expense was incurred. Accordingly, a user may not be properly reimbursed for incurred expenses.

BRIEF SUMMARY OF THE INVENTION

The present invention generally relates to an expense application capable of processing messages in order to update an expense report.

In one embodiment, a method for managing an expense report for an expense report application is provided. The expense report application is configured to update an expense report based on messages received from one or more messaging channels. The method includes receiving a message sent through a messaging channel in the one or more messaging channels. The message includes expense information. An expense report is determined for the message. The expense report is then updated with entry information determined from the expense information.

In one embodiment, a method for managing an expense report for an expense application is provided. The expense application is configured to update entries in the expense report based on messages received from one or more messaging channels. The method comprises: receiving a message sent through a messaging channel in the one or more messaging channels from a messaging device, the message including expense information; determining an expense report for the message; determining entry information from the expense information; and updating the expense report with the entry information.

In another embodiment, a method for processing messages for an expense application is provided. The messages are received through from one or more messaging channels. The method comprises: receiving a messaging device message through a messaging channel in the one or more messaging channels from a messaging device, the messaging device message including expense information; determining an expense application for the messaging device message; and sending an expense message to the expense application, the expense message including entry information determined from the expense information in the expense message.

In yet another embodiment, a system for processing messages for expense reports is provided. The system comprises: a messaging device configured to send a message including expense information, the messaging device configured to communicate through a messaging channel; and an expense application configured to receive the message through the messaging channel, the expense application configured to: determine an expense report for the message; determine entry information from the expense information; and update the expense report with the entry information.

In another embodiment, a system for processing messages for expense reports is provided. The system comprises: a messaging device configured to send a messaging device message including expense information, the device configured to communicate through a messaging channel; and a messaging server configured to: receive the messaging device message through the messaging channel; determine an expense application for the messaging device message; and send an expense message to the expense application, the expense message including entry information determined from the expense information; wherein the expense application is configured to update the expense report based on the entry information.

In another embodiment, an information storage medium having a plurality of instructions adapted to direct an information processing device to perform a set of steps for managing an expense report for an expense application is provided. The expense application is configured to update entries in the expense report based on messages received from one or more messaging channels. The steps comprise: receiving a message sent through a messaging channel in the one or more messaging channels from a messaging device, the message including expense information; determining an expense report for the message; determining entry information from the expense information; and updating the expense report with the entry information.

In another embodiment, an information storage medium having a plurality of instructions adapted to direct an information processing device to perform a set of steps for processing messages for an expense application is provided. The messages are received through from one or more messaging channels. The steps comprise: receiving a messaging device message through a messaging channel in the one or more messaging channels from a messaging device, the messaging device message including expense information; determining an expense application for the messaging device message; and sending an expense message to the expense application, the expense message including entry information determined from the expense information in the expense message.

A further understanding of the nature and the advantages of the inventions disclosed herein may be realized by reference of the remaining portions of the specification and the attached drawings.

DETAILED DESCRIPTION OF THE INVENTION

Figure 1:
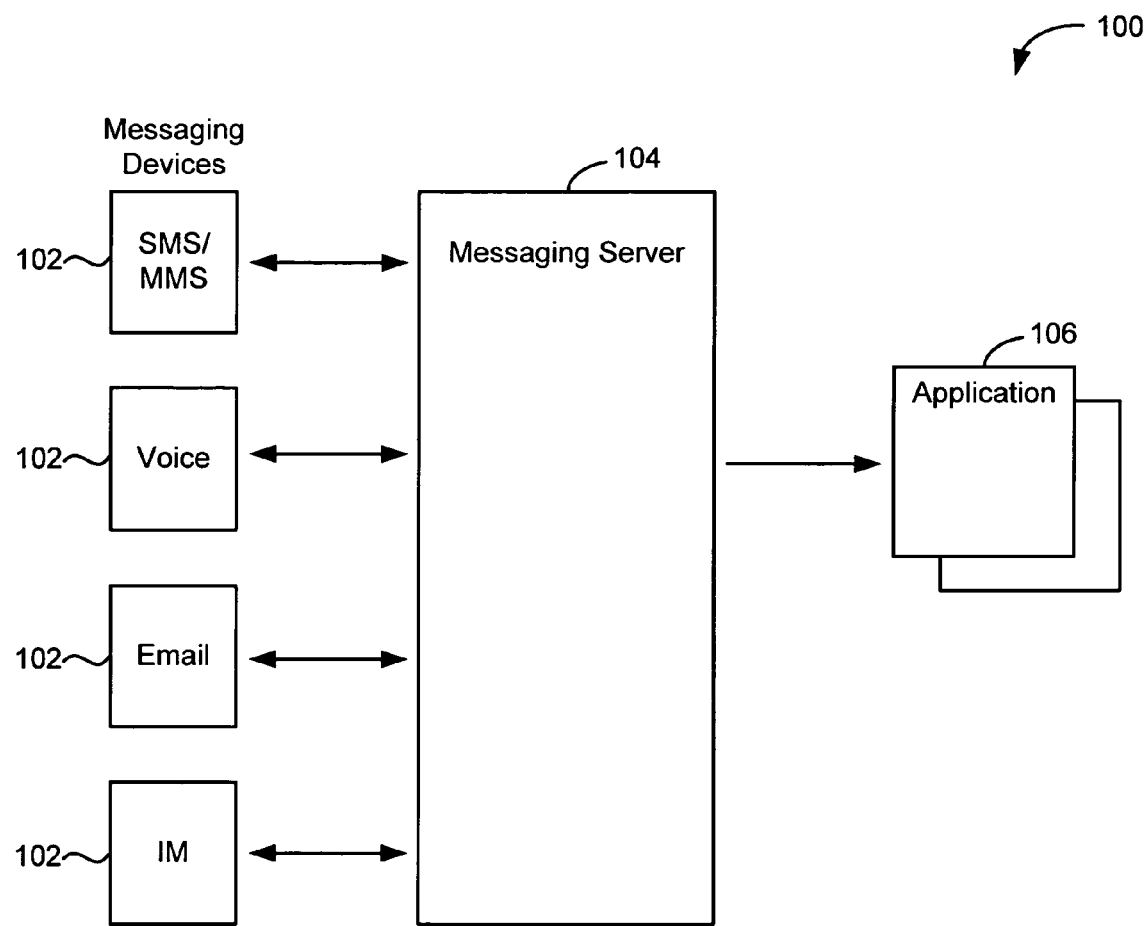
FIG. 1 depicts a system for managing an expense report according to one embodiment of the present invention.

FIG. 1 depicts a system 100 for managing an expense report according to one embodiment of the present invention. In one embodiment, system 100 includes one or more messaging devices 102, a messaging server 104, and one or more applications 106.

Messaging devices 102 include any devices that can send messages through messaging channels. A messaging channel is a channel in which messages of a certain format or protocol may be sent. For example, the messaging formats may be short message service (SMS), multimedia service (MMS), voice, email, instant message (IM), facsimile, etc. In one example, SMS messages may be sent through an SMS messaging channel. Also, MMS messages may be sent through an MMS messaging channel. Each messaging channel may require a different protocol or format in order to send the messages through the channel.

Messaging devices 102 may include cellular phones, personal digital assistants (PDAs), personal computers, workstations, fax machines, plain old telephone service (POTS) telephones, etc. Messaging devices 102 are configured to send messages through messaging channels. For example, an SMS device sends messages through an SMS channel. Also, a messaging device 102 may be configured to send messages through multiple messaging channels. For example, a cellular phone may be configured to send SMS and MMS messages through SMS and MMS messaging channels.

Messaging server 104 is configured to receive messages from messaging devices 102. In one embodiment, messaging server 104 can process messages that are received from multiple messaging channels. For example, messaging server 104 may process messages in the following formats: SMS, MMS, voice, email, IM, fax, SOAP, etc. A person of skill in the art will appreciate other messaging formats that can be processed by messaging server 104.

Messaging server 104 is also configured to send messages received from messaging devices 102 to application 106. Messaging server 104 may identify the application first. For example, the application may be identified based on an address to whom the message was sent or an address from which the message was sent. Messages received from messaging devices 102 may include expense information. The expense information may be information that should be used to update an expense report (e.g. add an expense item, delete or change an expense item). For example, a user may send a message to messaging server 104 that indicates that an expense report should be updated with certain expense information. Messaging server 104 is configured to determine an expense application 106. Once the application 106 is determined, the message is sent with the expense information to application 106.

In one embodiment, messaging server 104 and messaging devices 102 may engage in a conversation. For example, multiple messages may be sent back and forth among messaging devices 102, messaging server 104, and application 106. The messages may be used to determine an action to perform (such as updating an expense report). For example, a user may send a first message from a messaging device to messaging server 104 indicating an expense report to update. Messaging server 104 may then send a message asking what type of expense was incurred. Also, messaging server 104 may contact application 106, which then may send a message asking for any additional information that is needed from messaging devices 102 (e.g., distance travel for a mileage expense or rental agreement number for a rental car expense). This process may continue until information needed by application 106 is determined. The amount of iteration may vary significantly depending on the channel and the amount of information that can be provided per message. For example, in a MMS, email, and voice, all the information may be provided and dialog is needed only if the information is incorrect or not understandable; but via SMS it may be chunked into smaller data entries in multiple messages.

Embodiments of messaging server 104 are described in more detail in U.S. patent application Ser. No. 10/687,219, entitled "Actionable Messaging," filed on Oct. 15, 2003, which is hereby incorporated by reference in full for all purposes.

One or more applications 106 may include any expense applications. Application 106 is configured to receive a message from messaging devices 102 and, in response, configured to update an expense report. For example, application 106 may use the expense information in order to determine if an expense report should be updated. Then, entry information is determined from the expense information and an entry is updated with the entry information in the determined expense report.

Accordingly, application 106 is configured to perform actions in response to messages from messaging devices 102. A user may send messages using messaging devices 102 to application 106. Application 106 is then configured to update an expense report with information in the message. Accordingly, a user may update an expense report at any time. For example, when a user incurs an expense while traveling, the user can send a message, such as an SMS message, through a messaging channel from a cellular phone to application 106. Application 106 can then update a user's expense report based on the information sent in the message. Thus, an expense report can be updated without having a user directly access the application. In one embodiment, directly access is having a user open the application and update the expense report using the opened application.

Figure 2:
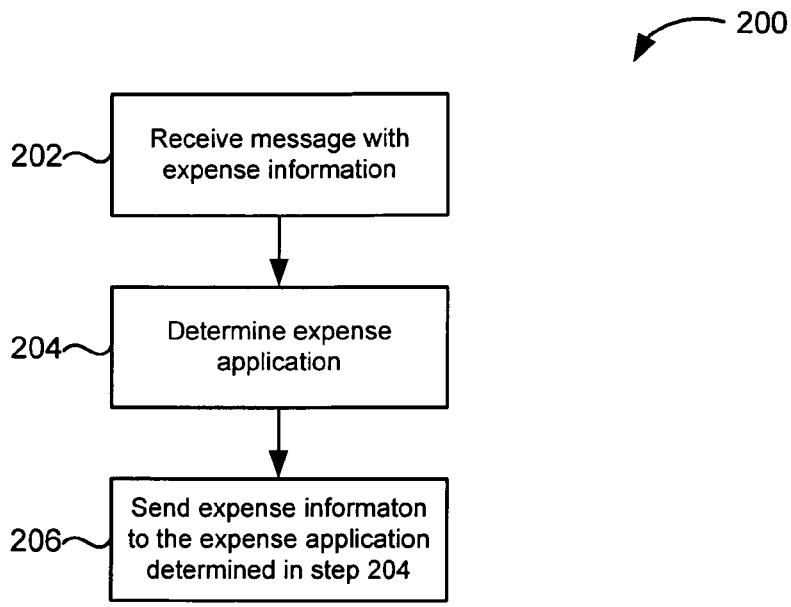
FIG. 2 depicts a simplified flowchart of a method for processing messages for an expense application according to one embodiment of the present invention.

FIG. 2 depicts a simplified flowchart 200 of a method for processing messages for an expense application according to one embodiment of the present invention. In step 202, messaging server 104 receives a message with expense information from a messaging device 102. The message may be received through any messaging channel mentioned above. In one embodiment, a user may be mobile. For example, a user may be mobile in that direct access to application 106 installed on a computing device may not be possible. Accordingly, a user may use a messaging device 102 to generate a message to send to application 106.

The generated message may include expense information. The expense information may describe the expense incurred. For example, expense information may be an expense identifier (e.g., a business trip), a category identifier (e.g., food), an amount, and any other information required to update an expense report.

A message may be free form in that a user may not need any forms that are required by application 106 to fill out an expense report. For example, a user may generate an email or SMS message that includes the above information. Identifiers may be used to indicate what the information is. For example, an expense identifier may be sent with information indicating that it is an expense identifier. Also, the messages may be sent in a certain form, where an expense identifier, category identifier, and amount may be specified. An example of a message that may be sent includes:

<cat>Toll<\cat><amount>5</amount><cur>GBP</cur><date>20030204</date ><com>London Bridge</com>.

The message above indicates an expense category of Toll for an amount of 5 GBP on the date of 20030204 at the London bridge. In another embodiment, using voice, the message can be free form such that the message is appropriately understood/interpreted by a dialog manager (e.g., a user or voice response system).

In one embodiment, authentication of the user may be performed. For example, a password may be verified. Also, a password challenge, phone ID (mobile station integrated service digital network (MISDN), phone number EMEI, or other identification may be required.

In step 204, messaging server 104 determines an expense application that is applicable for the message. Messaging server 104 may determine the expense application 106 based on the message sent. For example, a user that sent the message may use a certain application 106 that is associated with the user. Messaging server 104 may determine that the user uses the certain application 106 using a user ID, such as an email address or phone number, for the user. Also, the message may specify which expense application 106 to use. For example, the identifier for the expense application may be included in the message. Additionally, messaging server 104 may be configured to only send messages to a single application 106. Thus, any expense messages received by messaging server 104 may be forwarded to the single application 106.

In step 206, messaging server 104 sends the expense information to the expense application 106 determined in step 204. In one embodiment, the message may be forwarded to application 106. In another embodiment, the applicable expense information may be parsed from the message and sent to application 106 in a certain format. For example, different messaging devices 102 may send messages in different formats. The expense information may then be parsed out of the messages and formatted in a certain format that application 106 may recognize. For example, application 106 may be configured to respond to a command in a certain format. Messaging server 104 may be configured to generate a command in a certain format based on expense information received in messages sent in different formats.

Figure 3:
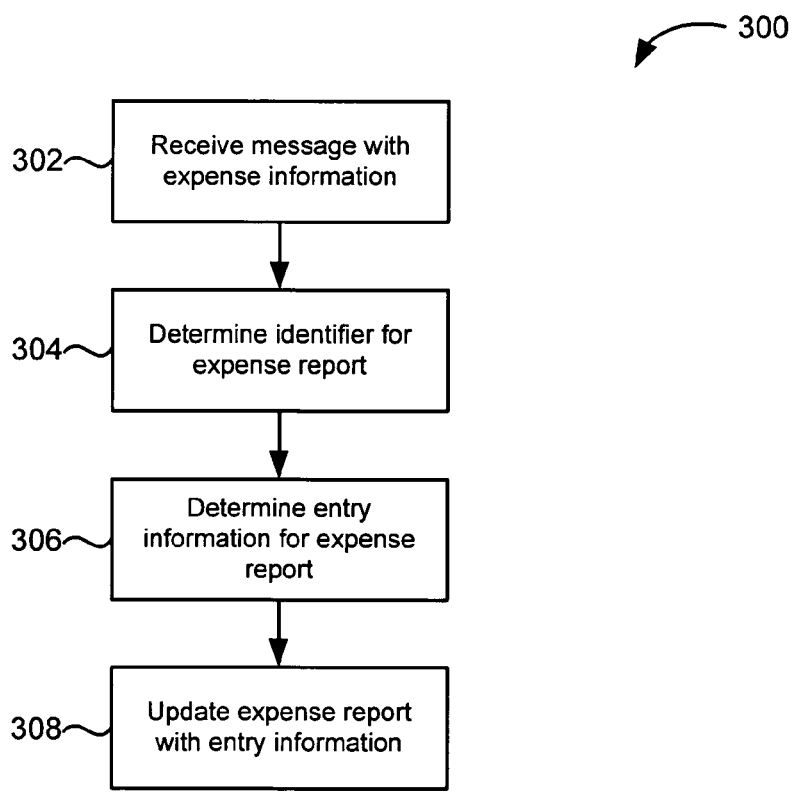
FIG. 3 depicts of simplified flowchart of a method for processing a message received from messaging devices using an expense report application according to one embodiment of the present invention.

FIG. 3 depicts of simplified flowchart 300 of a method for processing a message received from messaging devices 102 using an expense report application 106 according to one embodiment of the present invention. In step 302, a message is received with expense information. In one embodiment, the message is received from messaging server 104. In another embodiment, the message may be received directly from messaging devices 102.

In step 304, an identifier for an expense report is determined. For example, the message may be for a certain expense report. An expense report identifier may be determined from the expense information that indicates which expense report to access. Also, a user identifier may be used to determine the expense report. For example, a user may have a default expense report associated with an identifier, such as the user's username, phone number, email address, etc. The expense report associated with the identifier that sent the message may then be determined.

In step 306, application 106 determines entry information for the expense report. For example, the message received may include information that should be used to update an expense report. For example, an expense identifier, category identifier, and amount may be specified in the message. That information is determined from the message.

Also, expenses may be also be compiled in a single "repository" for the user and the user can then pick which expenses to group in a report or when to commit the expenses to an expense report. This may be done using messaging.

In step 308, application 106 updates the expense report with the entry information. For example, application 106 may create a new entry in an active expense report with the entry information. If the entry information indicated that a travel expense report with a category of food should be entered with the amount of $33.00, that entry is added to the travel expense report.

Although the above method is described as updating an existing expense report for a user, it will be recognized that application 106 may update an expense report by creating a new expense report for the user. For example, if an existing expense report is not found, a new expense report may be created and entry information in the new expense report is updated with the entry information.

Accordingly, application 106 is configured to receive a message through a messaging channel and update an expense report with entry information determined from the message. Thus, users may send messages while they are remotely located from a device that can directly access application 106. When a user is mobile, certain messaging channels may be easily accessible. For example, sending an SMS message to application 106 may be more convenient than finding computer that includes access to application 106. Accordingly, messaging channels that are easily accessed while a user is mobile may be used in order to update an expense report.

In addition to updating expense reports with entry information, system 100 may also enable other features to be performed with application 106. For example, the user may send a message to messaging devices 102 that requests an action from application 106. For example, a user may check or review an expense report by having the expense report sent to him/her, etc. Also, if an expense report is sent to a messaging device 102, a user can then complete any missing information, also to select what items to apply (add) to a report from a list of entered expense items, edit the expense report, and then send the report back to application 106.

Also, a user may submit an expense report for approval using messaging devices 102. A user may send a message requesting that application 106 submit the expense report for approval. Accordingly, a user may submit an expense report while the user is still on vacation or traveling, or anywhere where the user is remotely located from a device that allows direct access application 106.

Figure 4:
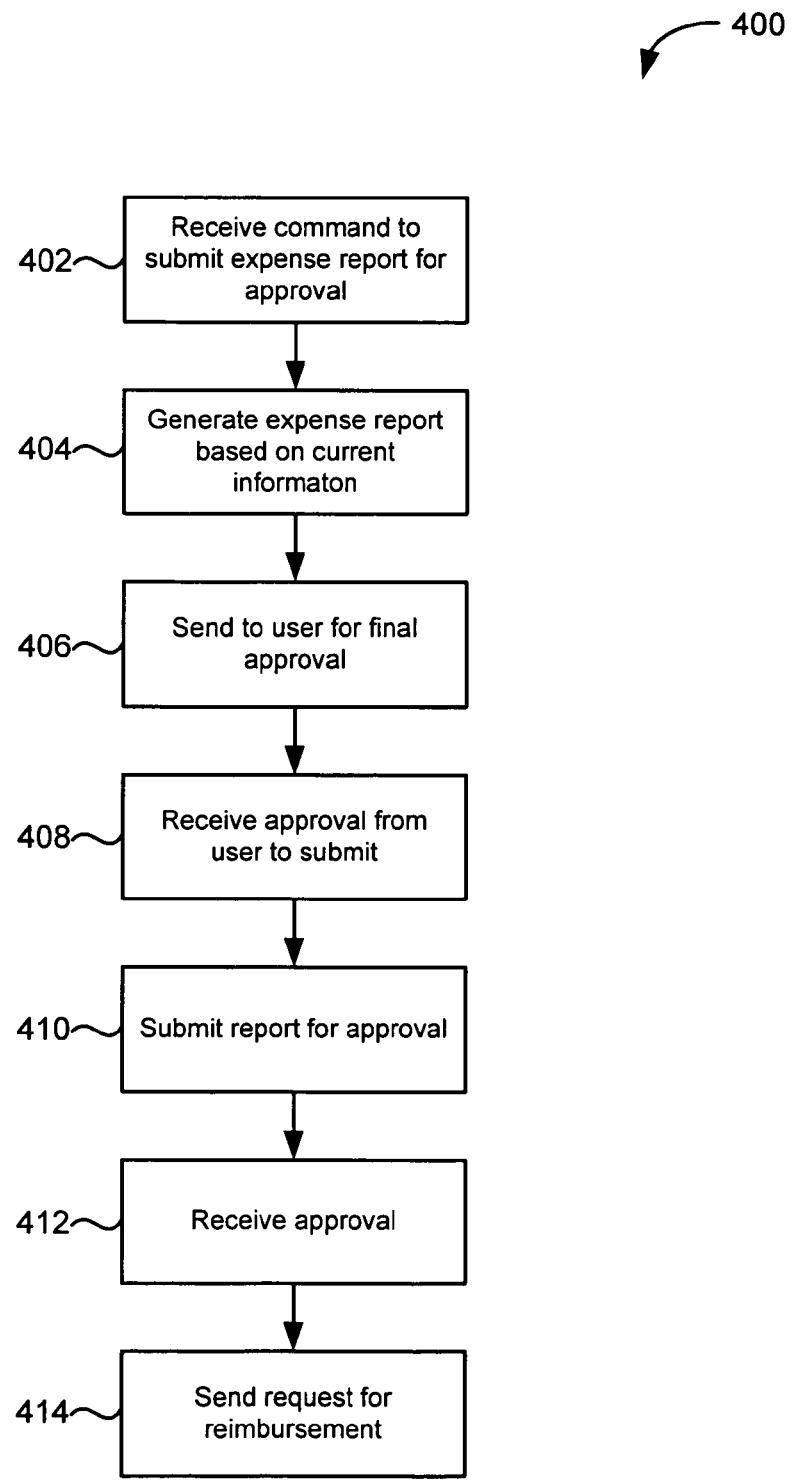
FIG. 4 depicts a simplified flowchart of a method for submitting an expense report for approval using messaging according to one embodiment of the present invention.

FIG. 4 depicts a simplified flowchart 400 of a method for submitting an expense report for approval using messaging according to one embodiment of the present invention. In one embodiment, the steps described herein may all be performed using messaging through any messaging channels.

In step 402, application 106 receives a command to submit an expense report for approval. The command may be received from messaging devices 102 through a messaging channel. For example, an SMS message may be sent indicating that a certain expense report should be submitted for approval.

In step 404, application 106 generates a completed expense report. For example, all entries in the expense report are used to generate a final expense report.

In step 406, the expense report is sent to the user for a final approval. For example, a user may need to authorize that the expense report should be submitted for approval. In one example, a digital signature may be added to the expense report. Also, a user may want to review the expense report to determine if any information is missing or needs to be edited. In one embodiment, this step may be omitted if a user does not need to provide a final approval.

In step 408, an approval is received from a user to submit the generated expense report. For example, a user may use messaging devices 102 to send a message through a messaging channel to application 106 indicating that the expense report should be submitted for approval. The approval may be received in a message that includes a digital signature from the user. Also, a message that just indicates that the expense report should be submitted may be sent. For example, a text message may be sent that says "expense report X approved for submission".

In step 410, application 106 submits the expense report for approval. For example, an expense report may need to be approved by a manager of the user. An expense report may be then sent to the manager. For example, the report may be sent through email, messaging, or any other electronic methods to the manager. Also, a message may be sent to the manager indicating that the manager should access the report and provide an approval.

In step 412, an approval for the expense report is received. For example, a manager may send a message through a messaging device 102 that indicates the expense report is approved. Also, a manager may access application 106 and indicate that the expense report is approved (or rejection) by answering the message. Similarly, the manager can use messaging to ask for more details for an expense.

In step 414, application 106 sends a request for reimbursement for the expense report. For example, a message may be sent to an entity responsible for reimbursement, such as an accounting department. Any requirements that are needed in order to have an expense report reimbursed may be adhered to. For example, all the necessary signatures or approvals may be included on the expense report. A digital signature from the user who submitted the expense report and digital signatures for the approval may be included on the expense report sent to the reimbursement entity by application 106.

The user associated with the expense report may then be reimbursed. For example, the accounting department may have a check for reimbursement sent to the user or have money directly deposited in the user's bank account. In some cases, receipts may have to be later submitted or any other requirements that are needed for reimbursement that cannot be done by messaging may have to be performed by the user. If legally acceptable, the receipts may also be faxed, printed, scanned, or photographed and sent via e-mail, fax, MMS, etc.

Accordingly, a user may use messaging devices 102 in order to have an expense report submitted for approval and reimbursement. For example, a user may, while traveling, decide that an expense report should be submitted. In one example, a user may be traveling from city to city and when the user departs one city, the user may want to submit an expense report for that city. Accordingly, when the user returns from traveling, a reimbursement check for that part of the trip may have already been generated. Conventionally, a user would have to wait until returning from traveling in order to access application 106 and submit the expense report. However, using embodiments of the present invention, a user may use messaging channels in order to have an expense report submitted for approval and for reimbursement.

An example using embodiments of the present invention will now be described. A user may be traveling and incur an expense, such as a taxi fare. The user may use a messaging device to send an SMS message (or any other message) through a messaging channel to application 106. The SMS message may include an expense report (e.g., Seoul, May 2004), an expense category (taxi), an expense amount ($5,000 YUAN), and a remark (hotel cab fare to meeting).

Messaging server 104 receives the SMS message and determines an application 106 in which to send the message. Application 106 would then receive the message and determine the expense report, i.e., a May 2004 Seoul expense report. Entry information such as expense category, expense amount, and remarks are then determined from the message. An entry is then added to the May 2004 Seoul expense report of a taxi expense of $5,000 KWONs with the remark that the expense was a hotel cab fare to a meeting.

If needed, multiple SMS messages may be sent. For example, messaging server 104 or application 106 may engage in a conversation in which information for the expense report may be determined. For example, application 106 may ask what the date the expense was incurred on, etc. A user may answer the question by sending another message to application 106.

Accordingly, a user may have an expense report updated immediately after incurring the expense. Also, a user may send a message at the end of a day detailing all the expenses that were incurred during the day. This may be done by sending messages using any messaging channels.

Embodiments of the present invention provide many advantages. For example, a user does not have to wait until returning from a trip to file an expense report. Rather, a user while traveling may use messaging channels that are easily accessible to send messages to an application 106. The application 106 is then configured to update an expense report based on the message. Thus, a convenient way of entering information in expense applications is provided. Users while being mobile may have access to messaging devices, such as SMS devices, MMS devices, etc., more so than a device that is configured to directly access application 106. Accordingly, messages may be sent that are interpreted by application 106 in order to update an expense report. Thus, an easy method of compiling an expense report is provided and may be used by a user while being mobile.

Figure 5:
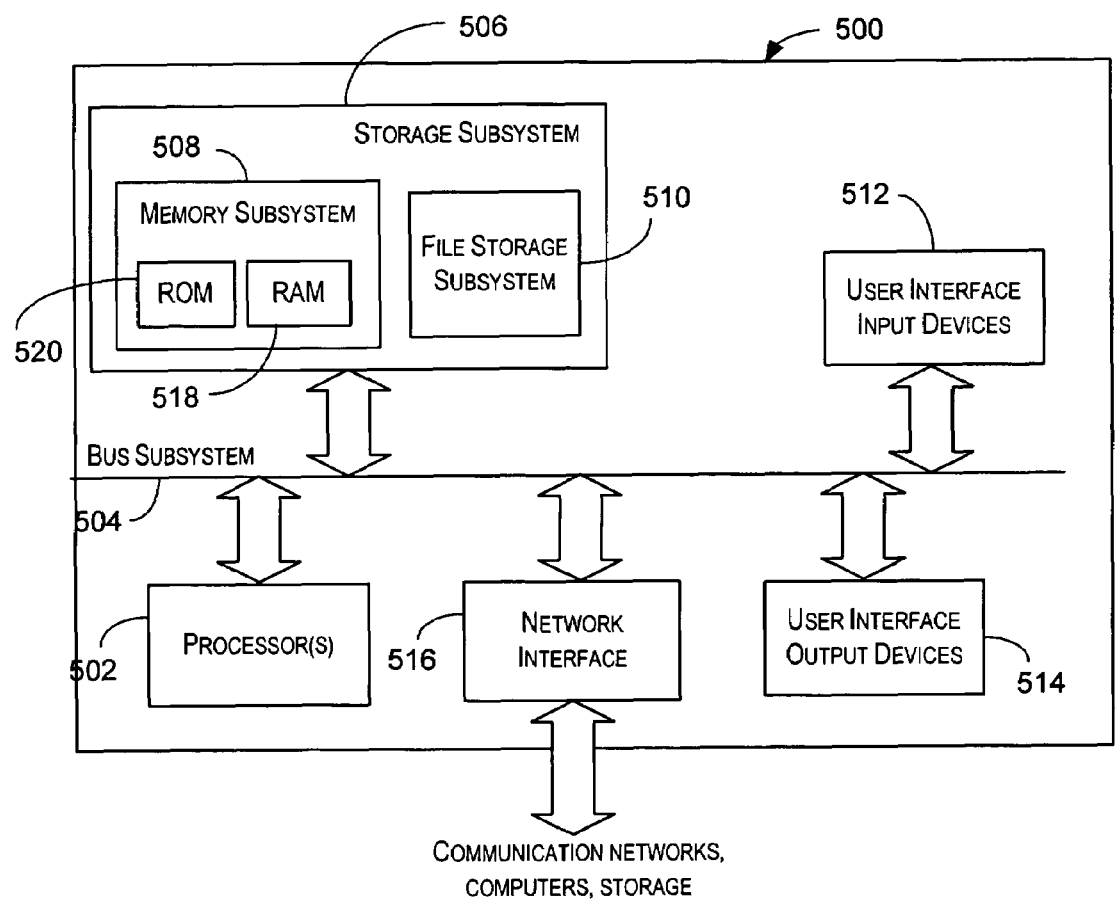
FIG. 5 is a simplified block diagram of a computer system according to an embodiment of the present invention.

FIG. 5 is a simplified block diagram of a computer system 500 according to an embodiment of the present invention. As shown in FIG. 5, computer system 500 includes at least one processor 502, which communicates with a number of peripheral devices via a bus subsystem 504. These peripheral devices may include a storage subsystem 506, comprising a memory subsystem 508 and a file storage subsystem 510, user interface input devices 512, user interface output devices 514, and a network interface subsystem 516. The input and output devices allow user interaction with computer system 500. A user may be a human user, a device, a process, another computer, or the like. Network interface subsystem 516 provides an interface to other computer systems and communication networks.

Bus subsystem 504 provides a mechanism for letting the various components and subsystems of computer system 500 communicate with each other as intended. The various subsystems and components of computer system 500 need not be at the same physical location but may be distributed at various locations within a network. Although bus subsystem 504 is shown schematically as a single bus, alternative embodiments of the bus subsystem may utilize multiple busses.

User interface input devices 512 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 500.

User interface output devices 514 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 500.

Storage subsystem 506 may be configured to store the basic programming and data constructs that provide the functionality of the computer system and of the present invention. For example, according to an embodiment of the present invention, software modules implementing the functionality of the present invention may be stored in storage subsystem 506 of messaging server 104 or a device including application 106. These software modules may be executed by processor(s) 502 of messaging server 104 or a device including application 106. In a distributed environment, the software modules may be stored on a plurality of computer systems and executed by processors of the plurality of computer systems. Storage subsystem 506 may also provide a repository for storing various databases that may be used by the present invention. Storage subsystem 506 may comprise memory subsystem 508 and file storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 500 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 500 depicted in FIG. 5 is intended only as a specific example for purposes of illustrating the preferred embodiment of the computer system. Many other configurations of a computer system are possible having more or fewer components than the computer system depicted in FIG. 5.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for managing an expense report for an expense application, the expense application configured to update entries in the expense report based on messages received from one or more messaging channels, the method comprising:
   receiving a message sent through a messaging channel in the one or more messaging channels from a messaging device, the message including expense information and being generated independent of the expense application, wherein the expense information includes a user identifier to identify an expense report to access;
   determining to access the expense report for the message after receiving the message based on the user identifier;
   determining entry information from the expense information;
   updating the expense report with the entry information in the received message; and
   storing the updated expense report for subsequent access.

2. The method of claim 1, wherein the message is received from a messaging server, the messaging server configured to process messages from the one or more messaging channels.

3. The method of claim 2, wherein messages are received from different channels in the one or more messaging channels.

4. The method of claim 1, wherein determining the entry information comprises determining at least one of an expense identifier, a category identifier, and an amount.

5. The method of claim 1, further comprising determining an expense application configured to update the expense report.

6. The method of claim 5, wherein determining the expense application comprises:
   determining an expense application identifier; and
   using the expense application identifier to determine the expense application.

7. The method of claim 1, further comprising performing an action in response to receiving the message.

8. The method of claim 7, wherein the action comprises sending a message to the messaging device in response to the received message based on the expense information.

9. The method of claim 8, wherein the action comprises sending a message requesting additional information other than information specified in the expense information.

10. The method of claim 1, further comprising authenticating a user that sent the message.

11. The method of claim 1, wherein the message is sent from a mobile user.

12. The method of claim 1, further comprising:
receiving a request for submitting the expense report for approval through a messaging channel in the one or more messaging channels; and
submitting the expense report to an entity for approval.

13. The method of claim 12, further comprising:
receiving approval from the entity; and
submitting the expense report for reimbursement.

14. The method of claim 13, wherein the approval is received through a messaging channel in the one or more messaging channels.

15. The method of claim 1, wherein the message received is a mobile message.

16. The method of claim 1, wherein the messaging channel comprises at least one of a SMS messaging channel, a MMS messaging channel, an IM messaging channel, an email messaging channel, a voicemail messaging channel, and a fax messaging channel.

17. The method of claim 1, wherein the messaging device comprises at least one of a cellular phone, a personal digital assistant (PDA), a personal computer, a workstation, a fax machine, and a plain old telephone service (POTS) telephone.

18. A method for processing messages for an expense application, the messages received through from one or more messaging channels, the method comprising:
receiving a messaging device message through a messaging channel in the one or more messaging channels from a messaging device, the messaging device message including expense information and being generated independent of the expense application, wherein the expense information includes a user identifier to identify an expense report to access;
determining the expense application for the messaging device message after receiving the messaging device message;
determining to access the expense report for the messaging device message after receiving the message based on the user identifier; and
sending an expense message to the expense application, the expense message including entry information determined from the expense information in the expense messaging device message.

19. The method of claim 18, wherein determining the expense application comprises:
determining an expense application identifier; and
using the expense application identifier to determine the expense application.

20. The method of claim 19, further comprising:
updating the expense report with the entry information.

21. The method of claim 19, wherein determining the expense application identifier comprising determining a user associated with the messaging device message, wherein the expense application comprises an expense application being used by the user.

22. The method of claim 18, further comprising:
receiving a response message from the expense application; and
sending the response message to a user that sent the message.

23. The method of claim 22, wherein sending the response message comprises sending the expense report.

24. The method of claim 23, wherein sending the response message comprises sending a message requesting additional information other than information specified by the expense information.

25. The method of claim 18, further comprising facilitating messaging between a user that sent the messaging device message and the expense application to determine information to use to update an expense report for the expense application.

26. The method of claim 18, further comprising:
storing the entry information, wherein the entry information is used to update an expense report at a later time.

27. The method of claim 26, wherein multiple entries of information are received and further comprising:
updating the expense report with the multiple entries of information received.

28. The method of claim 18, wherein the messaging device message received is a mobile message.

29. The method of claim 18, wherein the messaging device message and the expense message are substantially similar.

30. The method of claim 18, wherein the messaging device message and the expense message are in different formats.

31. The method of claim 18, wherein the messaging channel comprises at least one of a SMS messaging channel, a MMS messaging channel, an IM messaging channel, an email messaging channel, a voicemail messaging channel, and a fax messaging channel.

32. The method of claim 18, wherein the messaging device comprises at least one of a cellular phone, a personal digital assistant (PDA), a personal computer, a workstation, a fax machine, and a plain old telephone service (POTS) telephone.

33. A system for processing messages for expense reports, the system comprising:
a messaging device configured to generate a message including expense information without accessing an expense application, the messaging device further configured to send the message through a messaging channel, wherein the expense information includes a user identifier to identify the expense report to access; and
an expense application configured to receive the message through the messaging channel, the expense application configured to:
determine to access the expense report for the message after receiving the message based on the user identifier;
determine entry information from the expense information; and
update the expense report with the entry information.

34. The system of claim 33, further comprising a messaging server configured to receive the message from the device and to forward the message to the expense application.

35. The system of claim 33, wherein the messaging channel comprises at least one of a SMS messaging channel, a MMS messaging channel, an IM messaging channel, an email messaging channel, a voicemail messaging channel, and a fax messaging channel.

36. The system of claim 33, wherein the messaging device comprises at least one of a cellular phone, a personal digital assistant (PDA), a personal computer, a workstation, a fax machine, and a plain old telephone service (POTS) telephone.

37. The system of claim 33, wherein the entry information comprises at least one of an expense identifier, a category identifier, and an amount.

38. A system for processing messages for expense reports, the system comprising:
   a messaging device configured to generate a messaging device message including expense information without accessing an expense application, the messaging device further configured to send the message through a messaging channel, wherein the expense information includes a user identifier to identify an expense report to access; and
   a messaging server configured to:
      receive the messaging device message through the messaging channel;
      determine the expense application for the messaging device message after receiving the messaging device message;
      determine to access the expense report for the messaging device message after receiving the message based on the user identifier; and
      send an expense message to the expense application, the expense message including entry information determined from the expense information;
      wherein the expense application is configured to update the expense report based on the entry information.

39. The system of claim 38, wherein the messaging channel comprises at least one of a SMS messaging channel, a MMS messaging channel, an IM messaging channel, an email messaging channel, a voicemail messaging channel, and a fax messaging channel.

40. The system of claim 38, wherein the messaging device comprises at least one of a cellular phone, a personal digital assistant (PDA), a personal computer, a workstation, a fax machine, and a plain old telephone service (POTS) telephone.

41. The system of claim 38, wherein the entry information comprises at least one of an expense identifier, a category identifier, and an amount.

42. A computer program product stored on a computer-readable medium and including instructions operational by a processor of a computer system for managing an expense report for an expense application, the expense application configured to update entries in the expense report based on messages received from one or more messaging channels, the computer program product-comprising:
   program code for receiving a message sent through a messaging channel in the one or more messaging channels from a messaging device, the message including expense information and being generated independent of the expense application, wherein the expense information includes a user identifier to identify the expense report to access;
   program code for determining to access the expense report for the message after receiving the message based on the user identifier;
   program code for determining entry information from the expense information; and
   program code for updating the expense report with the entry information.

43. The computer program product of claim 42, wherein the message is received from a messaging server, the messaging server configured to process messages from the one or more messaging channels.

44. The computer program product of claim 43, wherein messages are received from different channels in the one or more messaging channels.

45. The computer program product of claim 42, wherein the message is sent from a mobile user.

46. The computer program product of claim 42, further comprising:
   program code for receiving a request for submitting the expense report for approval through a messaging channel in the one or more messaging channels; and
   program code for submitting the expense report to an entity for approval.

47. A computer program product stored on a computer-readable medium and including instructions operational by a processor of a computer system for processing messages for an expense application, the messages received through from one or more messaging channels, the computer program product comprising:
   program code for receiving a messaging device message through a messaging channel in the one or more messaging channels from a messaging device, the messaging device message including expense information and being generated independent of the expense application, wherein the expense information includes a user identifier to identify an expense report to access;
   program code for determining the expense application for the messaging device message after receiving the messaging device message;
   program code for determining to access the expense report for the messaging device message after receiving the message based on the user identifier; and
   program code for sending an expense message to the expense application, the expense message including entry information determined from the expense information in the expense message.

48. The computer program product of claim 47, wherein determining the expense application comprises:
   program code for determining an expense application identifier; and
   program code for using the expense application identifier to determine the expense application.

49. The computer program product of claim 48, further comprising:
   program code for updating the expense report with the entry information.

50. The computer program product of claim 47, further comprising program code for facilitating messaging between a user that sent the messaging device message and the expense application to determine information to use to update an expense report for the expense application.

* * * * *